F. RANDON.

CHUTES FOR STRAINING AND DELIVERING CANE-JUICE.

No. 7,039. Reissued April 4, 1876.

*Witnesses:*
Edwin James.
John R. Jones.

*Inventor:*
Francois Randon.
per J. E. T. Holmead.
Attorney.

N. PETERS, PHOTO-LITHOGRAPHER, WASHINGTON, D. C.

UNITED STATES PATENT OFFICE.

FRANÇOIS RANDON, OF NEW ORLEANS, LOUISIANA.

IMPROVEMENT IN CHUTES FOR STRAINING AND DELIVERING CANE-JUICE.

Specification forming part of Letters Patent No. 158,979, dated January 19, 1875; reissue No. 7,039, dated April 4, 1876; application filed March 20, 1876.

DIVISION B.

*To all whom it may concern:*

Be it known that I, FRANÇOIS RANDON, of New Orleans, in the parish of Orleans and State of Louisiana, have invented an Improved Apparatus for Treating Cane-Juice, on which Letters Patent of the United States were granted to me January 19, 1875, No. 158,979; that I am now the sole owner of said Letters Patent, and that the following is a full, clear, and exact description of the same, reference being had to the accompanying drawing, and the letters of reference marked thereon, making part of this specification, in which—

Figure 1:
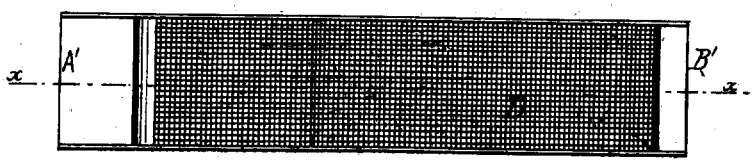
Figure 2:
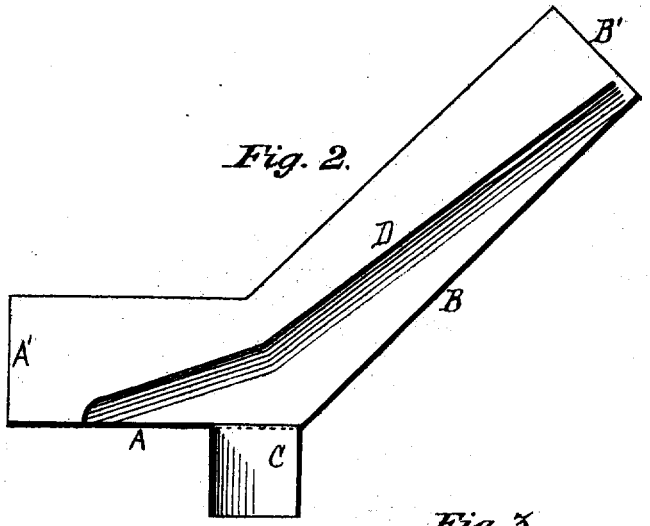
Figure 3:
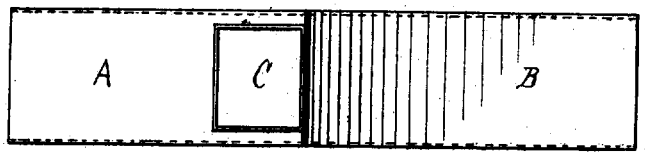
Figure 4:
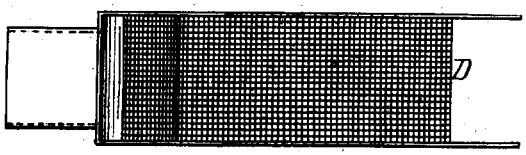

Figure 1 is a top-plan view. Fig. 2 is a longitudinal sectional view on the line *x x*, Fig. 1. Fig. 3 is a bottom-plan view. Fig. 4 is a detached view of the wire-gauze.

The present invention is an improved trough or chute designed to convey saccharine juice from a mill to a vessel, or from one vessel to another; and is so constructed as to insure of the juice or liquid being thoroughly strained in its passage.

The combined trough, or chute and strainer, owing to its novel form and construction, also possesses this advantage: Its end being left open at the section where the residuum or dirt would otherwise collect or be accumulated, the flow of the juice or liquid, through its pressure, automatically causes its discharge, which leaves the entire straining-surface free and unclogged, thus providing the surest guarantee that the liquid will all pass through the straining surface before reaching the section at which the residuum or dirt is discharged.

To accomplish these results, the nature of my invention consists in constructing the sieve-trough or chute in two sections, one angular or inclined, and the other straight or flat, each liquid-tight, and so connected as to provide a continuous trough or chute, with a discharge-opening in the bottom of the flat section, which is at its center, and near its point of union with the angular or inclined section of the trough. The trough or chute is provided with a supplemental bottom, which is constructed of wire-cloth or other suitable sieve material, and through which the liquid is strained as it flows, dropping to the solid bottom below, and is conveyed to the discharge-opening, through which it is fed to the vessel provided for its reception, or in connection with which the trough or chute is used.

The trough or chute is open at each end, which provides a free and unobstructed means of ingress for the unstrained liquid and juice, and a means which permits the trough or chute to be automatically relieved from all accumulations of sediment, residuum, or other impurities through the force or pressure incident to the rapid passage of the liquid or juice down the inclined surface of the sieve or supplemental bottom.

The construction and operation of my invention are as follows: The trough or chute proper is constructed of wood or any other suitable material; and consists of a straight or flat section, A, and an angular or inclined section, B, as clearly shown in Fig. 2. At the center of the bottom of the section A, and near its point of union with the section B, is a discharge-opening, C. D is a supplemental bottom, which is constructed of any suitable straining or sieve material, and is of the angular or inclined form shown in Fig. 2, and is so secured as to provide close, tight joints between the sieve or straining-surface and the sides of the trough. This trough, at its opposite ends, A′ B′, is open, which provides convenient means for the ingress of the liquid or juice, and for the automatic emptying of all residuum, &c. The trough or chute being arranged with its open section in connection with a mill or the supply-vessel, and the opening C in connection with the vessel to which the strained juice is designed to be fed, the device is ready for operation; and, as clearly shown in Fig. 2, owing to the form and arrangement of the supplemental or sieve bottom D, it not only presents the greatest amount of straining-surface for the juice to pass through, but readily empties the sediment and other impurities at the open mouth A′ of the trough, and to which point the sieve-bottom D, owing to its angular form, conveys them, as they are impelled or driven through the pressure of the juice. The juice, no matter at what section of the sieve D it is strained, falls to the liquid-tight bottom below, and thence passing to the opening C, and out thence to the vessel placed for its reception, or in connection with which the trough is used.

What I claim as new, and desire to secure by Letters Patent of the United States, is—

A combined sieve and trough or chute, consisting of the sections A B, set at an angle to each other, and provided with discharge-openings and the angular supplemental or sieve bottom D, the whole constructed and arranged to operate substantially as described.

In testimony whereof I have signed my name to this specification before two subscribing witnesses.

FRANÇOIS RANDON.

Witnesses:

A. DUCATEL, Jr.,
PAUL DUCATEL.